United States Patent
Weitzel

(10) Patent No.: US 6,605,663 B1
(45) Date of Patent: Aug. 12, 2003

(54) PROCESS FOR PREPARING POLYVINYL ALCOHOL-STABILIZED POLYMERS

(75) Inventor: Hans-Peter Weitzel, Reischach (DE)

(73) Assignee: Wacker Polymer Systems GmbH & Co. KG, Burghausen (DE)

(*) Notice: Subject to any disclaimer, the term of this patent is extended or adjusted under 35 U.S.C. 154(b) by 0 days.

(21) Appl. No.: 09/584,802

(22) Filed: May 31, 2000

(30) Foreign Application Priority Data

Jun. 24, 1999 (DE) ......................... 199 28 933

(51) Int. Cl.⁷ .................. C08L 29/04; C08L 33/08; C08L 33/10; C08F 2/16; C08F 2/22
(52) U.S. Cl. ................ 524/459; 524/560; 524/832; 526/78; 526/79; 526/80; 526/81
(58) Field of Search .................... 524/459, 566, 524/559, 560, 832, 833, 845, 853; 526/78, 79, 80, 81, 86, 89, 91

(56) References Cited

U.S. PATENT DOCUMENTS

| | | | | |
|---|---|---|---|---|
| 4,265,796 A | * | 5/1981 | Mueller-Mall et al. | 524/733 |
| 5,240,771 A | * | 8/1993 | Brueckmann et al. | 428/395 |
| 5,480,934 A | * | 1/1996 | Messner et al. | 524/458 |
| 5,679,735 A | | 10/1997 | Geissler et al. | |
| 5,705,553 A | * | 1/1998 | Kuropka | 524/459 |
| 5,753,036 A | * | 5/1998 | Hornaman et al. | 106/810 |
| 5,886,121 A | | 3/1999 | Kinkel et al. | |
| 5,977,244 A | | 11/1999 | Kohlhammer et al. | |

FOREIGN PATENT DOCUMENTS

| | | |
|---|---|---|
| CA | 1153140 | 8/1983 |
| DE | 19733133 | 2/1999 |
| EP | 0007042 | 1/1980 |
| EP | 671420 | 9/1995 |
| EP | 0718314 | 6/1996 |
| EP | 812863 | 12/1997 |
| EP | 821016 | 1/1998 |
| EP | 0821016 | 1/1998 |
| EP | 718314 | 7/1998 |
| GB | 2049712 | 12/1980 |
| WO | 94/20661 | 9/1994 |

OTHER PUBLICATIONS

Odian, George; Principles of Polymerization 3rd Edition, John Wiley & Sons, New York, 1991 (pp. 336–349).*
Odian, George; Principles of Polymerization 3rd Edition, John Wiley & Sons, New York, 1991 (pp. 339–341).*

Derwent Abstract corr. to EP 0 821 016 A2 (AN 1998–088852).

Fox, T. G., Bull. Am. Physics Soc. 1, 3, p. 123 [1956].

Polymer Handbook, 2$^{nd}$ Edition, J. Wiley & Sons, New York [1975].

English Abstract corresponding to EP 718314.

English Abstract corresponding to EP 821016.

English Abstract corresponding to EP 671420.

* cited by examiner

Primary Examiner—Callie Shosho
(74) Attorney, Agent, or Firm—Collard & Roe, P.C.

(57) ABSTRACT

A process is for preparing polyvinyl alcohol-stabilized addition polymers based on (meth)acrylate monomers in the form of their aqueous dispersions and water-redispersible dispersion powders by means of free-radically initiated emulsion polymerization or suspension polymerization of one or more monomers selected from the group consisting of the esters of acrylic acid and methacrylic acid and, if desired, further monomers copolymerizable therewith in the presence of one or more protective colloids from the group of the polyvinyl alcohols and, if appropriate, with drying of the resultant aqueous dispersion, which includes a) conducting polymerization in the presence of from 0.001% to 0.02% by weight of initiator and, if desired, from. 0.001% to 0.03% by weight of reducing agent, based in each case on the overall weight of the monomers, and b) including from 10% to 50% by weight of the monomers, based on the overall weight of the monomers, in the initial charge and metering in the rest, and, c) metering in the initiator and, if present, the reducing agent in toto, from 25% to 60% by weight of the total amount of initiator and, if present of reducing agent being metered in continuously until from 50% to 80% of the total polymerization time has elapsed, and d) in the remaining polymerization time, adding the remaining amount of initiator and, if present, reducing agent at an accelerated metering rate which is at least twice as high as in step c).

20 Claims, No Drawings

PROCESS FOR PREPARING POLYVINYL ALCOHOL-STABILIZED POLYMERS

BACKGROUND OF THE INVENTION

1. Field of the Invention

The present invention relates to a process for preparing polyvinyl alcohol-stabilized addition polymers based on (meth)acrylate monomers in the form of their aqueous dispersions and water-redispersible dispersion powders.

2. The Prior Art

Addition polymers stabilized by protective colloid are used in particular in the form of their aqueous dispersions or water-redispersible polymer powders in diverse applications. For example, they are useful as coating compositions or adhesives for a very wide variety of substrates. The protective colloids used are generally polyvinyl alcohols. The use of polyvinyl alcohol is worthwhile because, in comparison to systems stabilized by low molecular mass compounds (emulsifiers), it makes its own contribution to strength (e.g., tensile adhesion values in a tile adhesive). Monomers used to prepare redispersible powders are preferably vinyl esters and ethylene. This is because the stabilization of acrylate polymers or styrene-acrylate polymers by polyvinyl alcohol is not so easily accomplished. In particular, it is no trivial matter to stabilize an acrylate dispersion using polyvinyl alcohol alone in such a way that the resultant powders are stable to blocking and stable on storage. In general, for the purpose of obtaining a manageable dispersion viscosity, regulators are used in addition in order to reduce the molecular weight. This in turn greatly impairs the blocking stability of the powder.

Especially when addition polymers are used in the form of their redispersion powders to improve the properties of mortar, a major field of use for redispersion powders, the formulations are required to remain stable for a certain time. The formulations must not suffer any substantial alteration in their processing consistency (viscosity stability or cement stability). Indeed, a user cannot be expected to have to stir up a new mixture within a short time span. In the concrete and mortar industry, furthermore, an important part is played by the mechanical properties, such as the compressive strength, the porosity and thus the air pore content. If there are too many air pores the compressive strength falls sharply. If there are too few, or no, air pores in the mortar or concrete, the building material will lack sufficient freeze-thaw stability. The hydraulically setting systems enhanced with the dispersion powder are also intended, moreover, to give better adhesion than the unenhanced systems.

EP-B 718314 discloses a process for preparing polymer dispersions stabilized with protective colloid, in which at least 50% by weight of the monomers and up to 50% by weight of the initiator are introduced initially before the beginning of the polymerization and the remainder is metered in continuously. The initiator is used in the standard amounts of from 0.05% to 1.0% by weight, based on monomer.

EP-A 812863 describes a process for preparing polyvinyl alcohol-stabilized polymer dispersions based on acrylate monomer. This uses fully hydrolyzed polyvinyl alcohols having a defined low molecular weight for the purpose of stabilization and in which the polymerization is mandatorily conducted in the presence of regulators. Some of the monomers and initiator are included in the initial charge, and some is metered in.

For preparing polymer dispersions stabilized by protective colloid, EP-A 821016 recommends the copolymerization of relatively large amounts of hydroxyalkyl acrylates. As a result, the products obtained are markedly more susceptible to water than is desirable. For the polymerization, the oxidation component of the redox initiator is included in its entirety in the initial charge and the monomers and reducing agent are metered in continuously.

EP-A 671420 discloses aqueous, protective-colloid-stabilized dispersions of acrylate polymers having improved water resistance. They are obtained by polymerization in the presence of a mixture of polyvinyl alcohol and hydroxyethylcellulose. The preparation process it describes, with the metered addition of the total amount of monomer, leads to serviceable products only with this specific mixture.

SUMMARY OF THE INVENTION

It is an object of the present invention to provide a stable, low-viscosity, polyvinyl alcohol-stabilized dispersion and corresponding water-redispersible dispersion powders, based on acrylate monomers, which when used in cementitious applications possess a completely satisfactory viscosity stability or cement stability and do not hinder the setting of the cement.

Normally, emulsion polymerizations are conducted at high conversion, i.e. with little monomer, in order to avoid renewed nucleation of particles. Surprisingly it has now been found that only the opposite route leads to the objective. Thus polymerization must be conducted with very small amounts of initiator, with complete metering of the initiator using a metering gradient. That is, the first polymerization phase must be conducted with very large amounts of monomer, in order to obtain a dispersion which is free from gel specks and coagulum and has the desired properties, such as good cement stability and blocking stability of the resultant powders.

The present invention achieves this object by providing a process for preparing polyvinyl alcohol-stabilized addition polymers based on (meth)acrylate monomers in the form of their aqueous dispersions and water-redispersible dispersion powders by means of free-radically initiated emulsion polymerization or suspension polymerization of one or more monomers selected from the group consisting of the esters of acrylic acid and methacrylic acid and, if desired, further monomers copolymerizable therewith in the presence of one or more protective colloids from the group of the polyvinyl alcohols and, if appropriate, with drying of the resultant aqueous dispersion, which comprises a) conducting polymerization in the presence of from 0.001% to 0.02% by weight of initiator and, if desired, from 0.001% to 0.03% by weight of reducing agent, based in each case on the total weight of the monomers, and b) including from 10% to 50% by weight of the monomers, based on the total weight of the monomers, in the initial charge and metering in the rest, and c) metering in the initiator and, if present, the reducing agent in toto, from 25% to 60% by weight of the total amount of initiator and, if present of reducing agent being metered in continuously until from 50% to 80% of the total polymerization time has elapsed, and d) in the remaining polymerization time, adding the remaining amount of initiator and, if present, reducing agent at an accelerated metering rate which is at least twice as high as in step c).

Suitable monomers are selected from the group of the esters of acrylic acid and methacrylic acid and are esters of branched and unbranched alcohols having 1 to 15 carbon atoms. Preferred methacrylic esters and acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Particular preference is given to methyl acrylate, methyl methacrylate, n-butyl acrylate, and 2-ethylhexyl acrylate.

If desired, the methacrylic esters and acrylic esters can also be copolymerized with further monomers; for example, with one or more monomers selected from the group of the vinyl esters of branched or unbranched carboxylic acids having 1 to 12 carbon atoms, vinylaromatic compounds, vinyl halides, olefins and dienes. If these monomers are copolymerized, then it is generally in an amount of from 10% to 70% by weight, based on the total weight of the monomers.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, an example being VeoVa9® or VeoVa10® (tradenames of Shell). Vinyl acetate is particularly preferred. Preferred vinylaromatic compounds are styrene, methylstyrene and vinyltoluene. A preferred vinyl halide is vinyl chloride. The preferred olefins are ethylene and propylene and the preferred dienes are 1,3-butadiene and isoprene.

If desired it is also possible to copolymerize from 0.05% to 10% by weight, based on the total weight of the monomer mixture, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride, ethylenically unsaturated sulfonic acids and their salts, preferably vinylsulfonic acid and 2-acrylamido-2-methylpropanesulfonic acid. Further examples are precrosslinking comonomers such as polyethylenically unsaturated comonomers, examples being divinyl adipate, diallyl maleate, allyl methacrylate and triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are epoxy-functional comonomers such as glycidyl methacrylate and glycidyl acrylate. Further examples are silicon-functional comonomers, such as acryloxypropyltri(alkoxy)-silanes and methacryloxypropyltri(alkoxy)silanes, vinyl-trialkoxysilanes and vinylmethyldialkoxysilanes, the alkoxy groups present possibly being, for example, ethoxy and ethoxypropylene glycol ether radicals. Mention may also be made of monomers having hydroxyl groups or CO groups, examples being methacrylic and acrylic acid hydroxyalkylesters such as hydroxyethyl, hydroxypropyl and hydroxybutyl acrylate or methacrylate and also compounds such as diacetoneacrylamide and acetylacetoxyethyl acrylate or methacrylate.

Maximum preference is given to homopolymers and copolymers which contain one or more monomers selected from the group consisting of methyl acrylate, methyl methacrylate, ethyl acrylate, ethyl methacrylate, propyl acrylate, propyl methacrylate, n-butyl acrylate, n-butyl methacrylate, and 2-ethylhexyl acrylate, especially homopolymers of n-butyl acrylate or 2-ethylhexyl acrylate or copolymers of methyl methacrylate with n-butyl acrylate and/or 2-ethylhexyl acrylate; and also styrene-acrylate copolymers with one or more monomers selected from the group consisting of methyl acrylate, ethyl acrylate, propyl acrylate, n-butyl acrylate, and 2-ethylhexyl acrylate; vinyl acetate-acrylate copolymers with one or more monomers selected from the group consisting of methyl acrylate, ethyl acrylate, propyl acrylate, n-butyl acrylate, 2-ethylhexyl acrylate, and, if desired, ethylene; said homopolymers and copolymers may also if desired contain the abovementioned auxiliary monomers.

The monomer selection and the selection of the weight fractions of the comonomers are made so that in general the resulting glass transition temperature, Tg, is from −50° C. to +50° C., preferably from −30° C. to +40° C. The glass transition temperature, Tg, of the polymers can be determined in a known manner by means of differential scanning calorimetry (DSC). The Tg can also be calculated approximately in advance using the Fox equation. According to Fox T. G., *Bull. Am. Physics Soc.* 1, 3, page 123 (1956): $1/T_g = x_1/T_{g_1} + x_2/T_{g_2} + \ldots + x_n/T_{g_n}$, where $x_n$ represents the mass fraction (% by weight/100) of the monomer n and $T_{g_n}$ is the glass transition temperature, in kelvins, of the homopolymer of the monomer n. Tg values for homopolymers are listed in the *Polymer Handbook*, 2nd Edition, J. Wiley & Sons, New York (1975).

Preparation takes place by the emulsion polymerization process or by the suspension polymerization process, preferably by the emulsion polymerization process, the polymerization temperature being generally from 40° C. to 100° C., preferably from 60° C. to 90° C. Where gaseous comonomers such as ethylene, 1,3-butadiene or vinyl chloride are copolymerized it is also possible to operate under pressure, generally between 5 bar and 100 bar.

The polymerization is initiated with the water-soluble or monomer-soluble initiators, or redox initiator combinations, that are customary for emulsion polymerization or suspension polymerization, respectively. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. These initiators are used generally in an amount of from 0.001% to 0.02% by weight, preferably from 0.001% to 0.01% by weight, based in each case on the total weight of the monomers.

Redox initiators used are combinations of said initiators with reducing agents. Suitable reducing agents are the sulfites and bisulfites of alkali metals and of ammonium, an example being sodium sulfite, the derivatives of sulfoxylic acid, such as zinc or alkali metal formaldehyde-sulfoxylates, for example, sodium hydroxymethanesulfinate, and ascorbic acid. The amount of reducing agent is generally from 0.001% to 0.03% by weight, preferably from 0.001% to 0.015% by weight, based in each case on the overall weight of the monomers.

In order to control the molecular weight it is possible to use regulating substances during the polymerization. If regulators are used, it is normally in amounts of from 0.01% to 5.0% by weight, based on the monomers to be polymerized, and they are metered in separately or else as a premix with reaction components. Examples of such substances are n-dodecyl mercaptan, tert-dodecyl mercaptan, mercaptopropionic acid, methyl mercaptopropionate, isopropanol, and acetaldehyde. Preferably, no regulating substances are used.

Suitable polyvinyl alcohols are partly or fully hydrolyzed polyvinyl alcohols. Preference is given to partly hydrolyzed polyvinyl alcohols having a degree of hydrolysis of from 80 to 95 mol % and a Höppler viscosity in 4% strength aqueous solution of from 1 to 30 mPas (method according to Höppler at 20° C., DIN 53015). Also suitable are partly hydrolyzed, hydrophobically modified polyvinyl alcohols having a degree of hydrolysis of from 80 to 95 mol % and a Höppler viscosity in 4% strength aqueous solution of from 1 to 30 mPas. Examples thereof are partly hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably from 0.1% to 10% by weight, based on the overall weight of the partly hydrolyzed polyvinyl alcohol. It is also possible to use mixtures of said polyvinyl alcohols.

Further suitable polyvinyl alcohols are partly hydrolyzed, hydrophobicized polyvinyl alcohols obtained by polymer-analogous reaction, an example being acetalization of the vinyl alcohol units with $C_1$ to $C_4$ aldehydes such as butyraldehyde. The fraction of the hydrophobic units is preferably from 0.1% to 10% by weight, based on the overall weight of the partly hydrolyzed polyvinyl acetate. The degree of hydrolysis is from 80 to 95 mol %, preferably from 85 to 94 mol %, and the Höppler viscosity (DIN 53015, method according to Höppler, 4% strength aqueous solution) is from 1 to 30 mPas, preferably from 2 to 25 mPas.

Maximum preference is given to polyvinyl alcohols having a degree of hydrolysis of from 85 to 94 mol % and a Höppler viscosity in 4% strength aqueous solution of from 3 to 15 mPas (method according to Höppler at 20° C., DIN 53015). These protective colloids are obtainable by means of processes known to a person skilled in the art.

The polyvinyl alcohols are used in general in an amount of in total from 1% to 20% by weight, based on the total weight of the monomers, in the polymerization. The protective colloid fraction can either be included completely in the initial charge or else included in part in the initial charge and in part metered in. Preferably, at least 5% by weight of the protective colloid is included in the initial charge; most preferably, all of the protective colloid fraction is included in the initial charge.

In the process of the invention, polymerization is conducted preferably without adding emulsifiers. In exceptional cases, it may be of advantage to use, in addition, small amounts of emulsifiers, if appropriate from 1% to 5% by weight based on the monomer amount. Suitable emulsifiers include anionic, cationic, and nonionic emulsifiers, examples being anionic surfactants, such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units.

The monomers can be metered in in their entirety or included in factions in the initial charge with the remainder being metered in following the initiation of the polymerization. A preferred procedure is to include from 10% to 50% by weight, based on the total weight of the monomers, in the initial charge and to meter in the rest. In general, the rest of the monomers are metered in within 4 hours, preferably within 3 hours. Metering can be conducted separately (spatially and temporarily) or some or all of the components to be metered can be metered in pre-emulsified form.

The monomer conversion is controlled with the metered addition of initiator. The initiators are metered in in their entirety, the metered addition of initiator taking place relatively slowly in the first phase of the polymerization and being performed at a markedly increased metering rate in the final phase of the polymerization, in order to establish the abovementioned conversion rates. In the first phase of the polymerization, i.e. until from 50% to 80%, preferably from 70% to 80%, of the polymerization time has expired, from 25% to 60%, preferably from 50% to 60%, of the total amount of initiator is metered in and in the remaining polymerization time the remaining amount of initiator is added at an accelerated rate, preferably a metering rate which is at least twice as high, more preferably higher by a factor of from 3 to 8.

With these measures the polymerization is performed such that the monomer conversion after 30 minutes of polymerization time is not more than 70%, after 60 minutes of polymerization time is not more than 75%, after 90 minutes of polymerization time is not more than 80%, after 120 minutes of polymerization time is not more than 85%, after 150 minutes of polymerization time is not more than 88%, and after 180 minutes of polymerization time is not more than 90%, based in each case on the total amount of monomer introduced initially or metered in up to this point in time.

After the end of polymerization, the batch can be post-polymerized using known methods in order to remove residual monomer, by means, for example, of postpolymerization initiated by redox catalyst. Volatile residual monomers can also be removed by means of distillation, preferably under reduced pressure, and, if desired, with the passage of inert entraining gases such as air, nitrogen or steam through or over the batch.

The aqueous dispersions obtainable by the process of the invention have a solids content of from 30% to 75% by weight, preferably from 50% to 60% by weight. In order to prepare the water-redispersible polymer powders, the aqueous dispersions are admixed if desired with protective colloids as a spraying aid and then dried by means, for example, of fluidized bed drying, freeze drying, or spray drying. Preferably, the dispersions are spray-dried. Spray drying takes place in standard spray-drying units, it being possible for atomization to take place by means of one-fluid, two-fluid or multifluid nozzles or with a rotating disk. The exit temperature is generally chosen in the range from 45° C. to 120° C., preferably from 60° C. to 90° C., depending on the unit, on the Tg of the resin, and on the desired degree of drying.

In general, the spraying aid is used in a total amount of from 3% to 30% by weight, based on the polymeric constituents of a dispersion. In other words, the total amount of protective colloid prior to the drying operation should be from at least 3% to 30% by weight, based on the polymer fraction; it is preferred to use from 5% to 20% by weight based on the polymer fraction.

Suitable spraying aids are partly hydrolyzed polyvinyl alcohols; polyvinyl pyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soya protein, gelatin; ligninsulfonates, synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, and styrene-maleic acid and vinyl ether-maleic acid copolymers. Preferably, no protective colloids other than polyvinyl alcohols are used as spraying aids.

At the spraying stage it has in many cases been found advantageous to include up to 1.5% by weight of antifoam, based on the base polymer. In order to extend the storage life by improving the blocking stability, especially in the case of powders having a low glass transition temperature, the powder obtained can be provided with an antiblocking (anticaking) agent, preferably up to 30% by weight, based on the overall weight of polymeric constituents. Examples of antiblocking agents are Ca or Mg carbonate, talc, gypsum, silica, kaolins, and silicates having particle sizes preferably in the range from 10 nm to 10 μm.

The viscosity of the feed to be sprayed is adjusted by way of the solids content so as to give a value of <500 mPas (Brookfield viscosity at 20 revolutions and 23° C.), preferably <250 mPas. The solids content of the dispersion to be sprayed is >35%, preferably >40%.

In order to improve the performance properties, further additives can be added at the spraying stage. Examples of further constituents of dispersion powder compositions, present in preferred embodiments, are pigments, fillers, foam stabilizers, and hydrophobicizers.

The aqueous polymer dispersions and the water-redispersible polymer powders stabilized by protective colloid can be used in the application fields typical for such products. They can be used, for example, in chemical products for the building industry in conjunction with hydraulically setting binders such as cement (Portland, Aluminate, Pozzolanic, Slag, Magnesia, and Phosphate cement), gypsum, waterglass, and for producing construction adhesives, plasters and renders, grouting compositions, floor-filling compositions, sealing compounds, jointing mortars, and paints, and also as sole binders for coating compositions and adhesives or as coating compositions and/or binders for textiles and paper.

Other objects and features of the present invention will become apparent from the following detailed description considered in connection with the accompanying Examples which disclose several embodiments of the present invention. It should be understood, however, that the Examples are designed for the purpose of illustration only and not as a definition of the limits of the invention.

DETAILED DESCRIPTION OF PREFERRED EMBODIMENTS

EXAMPLE 1

A polymerization vessel with a volume of 12 liters was charged with 2230 g of water, 2380 g of a 20% strength aqueous solution of a polyvinyl alcohol having a degree of hydrolysis of 88 mol % and a Höppler viscosity of 4 mPas, 10 g of iron ammonium sulfate (1% strength in water) and with 1050 g of butyl acrylate and 617 g of methyl methacrylate, and this initial charge was heated to 70° C. Subsequently, tert-butyl hydroperoxide (0.1% strength in water) and Brüggolit (sodium hydroxymethanesulfinate) (0.15% strength in water) were metered in continuously each at 10 g/h. Starting from the beginning of polymerization, discernible from the rise in the internal temperature, the residual monomer mixture, consisting of 1950 g of butyl acrylate and 1150 g of methyl methacrylate, was metered in continuously in 3.5 h at 885 g/h. 3 h after the beginning of the reaction, the initiator metering rate was increased continuously to 60 g/h over the course of 1 h. Polymerization was continued until heated polymerization was no longer observed. To remove residual monomer, the batch was cooled to 30° C. and then postpolymerized with 10 g of tert-butyl hydroperoxide (10% strength in water) and 20 g of Brüggolit (10% strength in water).

The progress of conversion was as follows:

| Time (min) | Solids content (%) | Monomer conversion (%) |
|---|---|---|
| 0* | 14.3 | 41.93 |
| 30 | 25.1 | 65.38 |
| 60 | 29.1 | 69.06 |
| 90 | 33.2 | 73.07 |
| 120 | 36.5 | 75.47 |
| 150 | 39.4 | 77.28 |
| 180 | 42.4 | 79.49 |
| End | 53.7 | 100 |

*Time 0 is defined as the time at which monomer metering is commenced.

This gave a dispersion having a solids content of 53.7%, a viscosity of 680 mPas (Brookfield 20 at 23° C.), a pH of 4.3, and a particle size diameter Dw of 800 nm. The sieve residue on sieving above 250 μm was 2 g. The free residual monomer content was <100 ppm. The dispersion was stable in cement.

EXAMPLE 2

A polymerization vessel with a volume of 12 liters was charged with 2590 g of water, 2450 g of a 20% strength aqueous solution of a polyvinyl alcohol having a degree of hydrolysis of 88 mol % and a Höppler viscosity of 4 mPas, 10 g of iron ammonium sulfate (1% strength in water) and with 980 g of styrene and 1470 g of 2-ethylhexyl acrylate, and this initial charge was heated to 70° C. Subsequently, tert-butyl hydroperoxide (0.1% strength in water) and Brüggolit (sodium hydroxymethanesulfinate) (0.15% strength in water) were metered in continuously each at 50 g/h. Starting from the beginning of polymerization, discernible from the rise in the internal temperature, the residual monomer mixture, consisting of 980 g of styrene and 1470 g of 2-ethylhexyl acrylate, was metered in continuously in 2.5 h at 980 g/h. 3 h after the beginning of the reaction, the initiator metering rate was increased continuously to 100 g/h over the course of 1 h. Polymerization was continued until heated polymerization was no longer observed. To remove residual monomer, the batch was cooled to 30° C. and then postpolymerized with 10 g of tert-butyl hydroperoxide (10% strength in water) and 20 g of Brüggolit (10% strength in water).

The progress of conversion was as follows:

| Time (min) | Solids content (%) | Monomer conversion (%) |
|---|---|---|
| 0* | 24.8 | 63.18 |
| 30 | 29.8 | 69.79 |
| 60 | 34.2 | 74.77 |

-continued

| Time (min) | Solids content (%) | Monomer conversion (%) |
| --- | --- | --- |
| 90 | 36.5 | 75.40 |
| 120 | 40.0 | 78.78 |
| 150 | 45.4 | 85.04 |
| 180 | 46.6 | 85.83 |
| End | 51.0 | 100 |

*Time 0 is defined as the time at which monomer metering is commenced.

This gave a dispersion having a solids content of 51.0%, a viscosity of 3000 mPas (Brookfield 20 at 23° C.), a pH of 4.1, and a particle size diameter Dw of 750 nm. The sieve residue on sieving above 250 μm was 3 g. The free residual monomer content was <50 ppm. The dispersion was stable in cement.

EXAMPLE 3

A polymerization vessel with a volume of 12 liters was charged with 1330 g of water, 1430 g of a 20% strength aqueous solution of a polyvinyl alcohol having a degree of hydrolysis of 88 mol % and a Höppler viscosity of 4 mPas, 950 g of 20% strength aqueous solution of a hydrophobically modified polyvinyl alcohol having a degree of hydrolysis of 88 mol % and a Höppler viscosity of 4 mPas, 10 g of iron ammonium sulfate (1% strength in water) and with 1170 g of butyl acrylate and 500 g of methyl methacrylate, and this initial charge was heated to 70° C. Subsequently, tert-butyl hydroperoxide (0.1% strength in water) and Brüggolit (sodium hydroxymethanesulfinate) (0.15% strength in water) were metered in continuously each at 30 g/h. Starting from the beginning of polymerization, discernible from the rise in the internal temperature, the residual monomer mixture, consisting of 2160 g of butyl acrylate and 928 g of methyl methacrylate, was metered in continuously in 3.5 h at 880 g/h. 3 h after the beginning of the reaction, the initiator metering rate was increased continuously to 100 g/h over the course of 1 h. Polymerization was continued until heated polymerization was no longer observed. To remove residual monomer, the batch was cooled to 30° C. and then postpolymerized with 10 g of tert-butyl hydroperoxide (10% strength in water) and 20 g of Brüggolit (10% strength in water).

The progress of conversion was as follows:

| Time (min) | Solids content (%) | Monomer conversion (%) |
| --- | --- | --- |
| 0* | 10.8 | 27.08 |
| 30 | 23.9 | 54.07 |
| 60 | 29.9 | 62.45 |
| 90 | 35.0 | 68.57 |
| 120 | 39.5 | 73.42 |
| 150 | 43.8 | 77.90 |
| 180 | 44.8 | 76.76 |
| End | 56.0 | 100 |

*Time 0 is defined as the time at which monomer metering is commenced.

This gave a dispersion having a solids content of 56.0%, a viscosity of 1440 mPas (Brookfield 20 at 23° C.), a pH of 4.1, and a particle size diameter Dw of 750 nm. The sieve residue on sieving above 250 μm was 2 g. The free residual monomer content was <50 ppm. The dispersion was stable in cement.

COMPARATIVE EXAMPLE 4

A polymerization vessel with a volume of 12 liters was charged with 2460 g of water, 1420 g of a 20% strength aqueous solution of a polyvinyl alcohol having a degree of hydrolysis of 88 mol % and a Höppler viscosity of 4 mPas, 950 g of 20% strength aqueous solution of a hydrophobically modified polyvinyl alcohol having a degree of hydrolysis of 88 mol % and a Höppler viscosity of 4 mPas, 10 g of iron ammonium sulfate (1% strength in water) and with 1490 g of butyl acrylate and 880 g of methyl methacrylate, and this initial charge was heated to 70° C. Subsequently, tert-butyl hydroperoxide (1.0% strength in water) and Brüggolit (sodium hydroxymethanesulfinate) (1.5% strength in water) were metered in continuously each at 10 g/h. Starting from the beginning of polymerization, discernible from the rise in the internal temperature, the residual monomer mixture, consisting of 1490 g of butyl acrylate and 928 g of methyl methacrylate, was metered in continuously in 3.5 h at 880 g/h. 3 h after the beginning of the reaction, the initiator metering rate was increased continuously to 50 g/h over the course of 1 h. Polymerization was continued until heated polymerization was no longer observed. To remove residual monomer, the batch was cooled to 30° C. and then postpolymerized with 10 g of tert-butyl hydroperoxide (10% strength in water) and 20 g of Brüggolit (10% strength in water).

The progress of conversion was as follows:

| Time (min) | Solids content (%) | Monomer conversion (%) |
| --- | --- | --- |
| 0* | 29.7 | 75.19 |
| 30 | 34.3 | 81.30 |
| 60 | 41.4 | 92.74 |
| 90 | 44.1 | 94.04 |
| 120 | 45.5 | 92.93 |
| 150 | 47.3 | 92.98 |
| 180 | 48.1 | 91.38 |
| End | 50.9 | 100 |

*Time 0 is defined as the time at which monomer metering is commenced.

This gave a dispersion having a solids content of 50.9%, a viscosity of 3300 mPas (Brookfield 20 at 23° C.), a pH of 4.1, and a particle size diameter Dw of 1150 nm. The sieve residue on sieving above 250 μm was 45 g. The free residual monomer content was <100 ppm. The dispersion coagulated in the cement.

Powder Preparation

The dispersions from Examples 1 to 3 and Comparative Example 4 were admixed with 5% by weight (solids/solids) of polyvinyl alcohol having a degree of hydrolysis of 88 mol % and a Höppler viscosity of 4 mPas and diluted with water to a spray viscosity of 250 mPas. The dispersion was then sprayed using a two-fluid nozzle. The spraying component used was air precompressed to 4 bar, and the droplets formed were dried cocurrently with air heated to 125° C. The dry powder obtained was admixed with 10% by weight of commercial antiblocking agent (mixture of calcium magnesium carbonate and magnesium hydrosilicate).

Redispersion Behavior of the Polymer Films 0.2 mm thick films of the dispersions of the above examples (before spraying drying) were produced on glass plates and were dried at 105° C. for 15 minutes. To examine the film redispersibility, one drop of water was applied to a homogeneous site of the test film using a pipette at room temperature, and after leaving it to act for 60 seconds the water drop was rubbed at the same site using the fingertip until the glass plate at this site was film-free, the film fragmented, or the film retained its integrity completely.

The redispersibility of the polymer films was assessed using the following evaluation scheme:
- rating 1: film can be redispersed immediately by slight rubbing or redisperses automatically;
- rating 2: film can be redispersed by rubbing, film fragments of low redispersibility possible;
- rating 3: film can be redispersed only by vigorous rubbing, and film fragments are formed;
- rating 4: film cannot be redispersed even by prolonged vigorous rubbing, but instead fragments.

Determination of the Settling Behavior of the Powders (Tube Settlement)

To determine the settling behavior, 50 g of each of the dispersion powders were redispersed in 50 ml of water, then diluted to 0.5% solids content, and the height of settled solids is measured for 100 ml of this redispersion poured into a graduated tube and measured after 1 hour.

Determination of the Blocking Resistance

To determine the blocking resistance, the dispersion powder was placed in an iron tube with a thread and then subjected to the load of a metal ram. Loading was followed by storage at 50° C. for 16 hours in a drying cabinet. After cooling to room temperature, the powder was removed from the tube and the blocking stability was determined qualitatively by crushing the powder. The blocking stability was classified as follows:
- 1=very good blocking stability
- 2=good blocking stability
- 3=satisfactory blocking stability
- 4=not stable to blocking, powder after crushing no longer free-flowing.

Determination of the Cement Stability

A cement mixture was prepared by stirring to the following formulation:

| | |
|---|---|
| Portland cement | 82.5 g |
| Calcite (CaCO$_3$) 10–40 mm | 75 g |
| Quartz sand 200–500 mm | 142 g |
| Dispersion powder | 14.5 g |
| Water | 85 g |

The processability of the cement mixture was observed and assessed qualitatively over a period of 2 hours.

The test results are collated in Table 1.

TABLE 1

| Ex. | Redisperability | Tube settlement [cm] | Blocking resistance | Cement stability |
|---|---|---|---|---|
| Ex. 1 | 1 | 1.5 | 1 | stable |
| Ex. 2 | 1 | 2.0 | 1–2 | stable |
| Ex. 3 | 1 | 1.0 | 1 | stable |
| C. Ex. 4 | 2 | 5.5 | 4 | coagulates |

With the procedure of the invention it is possible to achieve distinct improvements in the blocking stability and hence the storage stability of the powders. Furthermore, the redispersibility and the cement stability are distinctly improved.

Accordingly, while a few embodiments of the present invention have been shown and described, it is to be understood that many changes and modifications may be made thereunto without departing from the spirit and scope of the invention as defined in the appended claims.

What is claimed is:

1. A process for preparing polyvinyl alcohol-stabilized addition polymers based on (meth)acrylate monomers in the form of their aqueous dispersions and water-redispersible dispersion powders by means of a polymerization selected from the group consisting of free-radically initiated emulsion polymerization and suspension polymerization of at least one monomer selected from the group consisting of the esters of acrylic acid, esters of methacrylic acid and further monomers copolymerizable therewith, in the presence of at least one protective colloid from the group of polyvinyl alcohols, which consists of the following steps and ingredients:

a) conducting polymerization in the presence of from 0.001% to 0.01% by weight of initiator based on the total weight of the monomers, and b) including from 10% to 50% by weight of the monomers, based on the total weight of the monomers, in the initial charge and metering in the rest, and c) metering in the initiator comprising from 25% to 60% by weight of the total amount of initiator and, continuously until from 50% to 80% of the total polymerization time has elapsed, and d) in the remaining polymerization time, adding the remaining amount of initiator and at an accelerated metering rate which is at least twice as high as in step c);

wherein the monomers and free-radical initiators are metered in such that the monomer conversion after 30 minutes of polymerization time is not more than 70%, after 60 minutes of polymerization time is not more than 75%, after 90 minutes of polymerization time is not more than 80%, after 120 minutes of polymerization time is not more than 85%, after 150 minutes of polymerization time is not more than 88%, after 180 minutes of polymerization time is not more than 90%, based in each case on the total amount of monomer introduced initially or metered in up to this point in time.

2. The process as claimed in claim 1, wherein the metering of the initiator in step c) takes place until from 70% to 80% of the total polymerization time has elapsed.

3. The process as claimed in claim 1, wherein the remainder of initiator is added in step d) at an accelerated metering rate which is higher by a factor of from 3 to 8 than in step c).

4. The process as claimed in claim 1, wherein the polyvinyl alcohols used are selected from the group consisting of partly hydrolyzed polyvinyl alcohols, partly hydrolyzed hydrophobically modified polyvinyl alcohols having in each case a degree of hydrolysis of from 80 to 95 mol % and a Höppler viscosity in 4% strength aqueous solution of from 1 to 30 mPas, and mixtures thereof.

5. The process as claimed in claim 4,
wherein partly hydrolyzed polyvinyl alcohols having a degree of hydrolysis of 85 to 94 mol % and a Höppler viscosity in 4% strength aqueous solution of from 3 to 15 mPas are used.

6. The process as claimed of claim 1,
wherein at least 5% by weight of the protective colloid fraction is included in the initial charge and the remainder is metered in.

7. A formulation constituent in conjunction with inorganic hydraulically setting binders in construction adhesives, plasters and renders, grouting compositions, floor-filling compositions, jointing mortars, and paints, comprising a product produced by the process of claim 1.

8. A sole binder for coating compositions and adhesives, comprising a product produced by the process of claim 1.

9. A coating composition and binder for textiles and paper, comprising a product produced by the process of claim 1.

10. A process for preparing polyvinyl alcohol-stabilized addition polymers based on (meth)acrylate monomers in the form of their aqueous dispersions and water-redispersible dispersion powders by means of a polymerization selected from the group consisting of free-radically initiated emulsion polymerization and suspension polymerization of at least one monomer selected from the group consisting of the esters of acrylic acid, esters of methacrylic acid and further monomers copolymerizable therewith, in the presence of at least one protective colloid from the group of polyvinyl alcohols, which consists of the following steps and ingredients:
  a) conducting polymerization in the presence of from 0.001% to 0.01% by weight of initiator and, from 0.001% to 0.015% by weight of reducing agent, based in each case on the total weight of the monomers, and
  b) including from 10% to 50% by weight of the monomers, based on the total weight of the monomers, in the initial charge and metering in the rest, and
  c) metering in the initiator and the reducing agent in toto, from 25% to 60% by weight of the total amount of initiator and of reducing agent being metered in continuously from 50% to 80% of the total polymerization time has elapsed, and
  d) in the remaining polymerization time, adding the remaining amount of initiator and reducing agent at an accelerated metering rate which is at least twice as high as in step c);
  wherein the monomers and free-radical initiators are metered in such that the monomer conversion
  after 30 minutes of polymerization time is not more than 70%,
  after 60 minutes of polymerization time is not more than 75%,
  after 90 minutes of polymerization time is not more than 80%,
  after 120 minutes of polymerization time is not more than 85%,
  after 150 minutes of polymerization time is not more than 88%,
  after 180 minutes of polymerization time is not more than 90%,
  based in each case on the total amount of monomer introduced initially or metered in up to this point in time.

11. The process as claimed in claim 10,
wherein the metering of the initiator and of the reducing agent in step c) takes place until from 70% to 80% of the total polymerization time has elapsed.

12. The process as claimed in claim 10,
wherein the remainder of initiator and reducing agent is added in step d) at an accelerated metering rate which is higher by a factor of from 3 to 8 than in step c).

13. The process as claimed in claim 10,
wherein the polyvinyl alcohols used are selected from the group consisting of partly hydrolyzed polyvinyl alcohols, partly hydrolyzed hydrophobically modified polyvinyl alcohols having in each case a degree of hydrolysis of from 80 to 95 mol % and a Höppler viscosity in 4% strength aqueous solution of from 1 to 30 mPas and mixtures thereof.

14. The process as claimed in claim 13,
wherein partly hydrolyzed polyvinyl alcohols having a degree of hydrolysis of 85 to 94 mol % and a Höppler viscosity in 4% strength aqueous solution of from 3 to 15 mPas are used.

15. The process as claimed of claim 10,
wherein at least 5% by weight of the protective colloid fraction is included in the initial charge and the remainder is metered in.

16. A formulation constituent in conjunction with inorganic hydraulically setting binders in construction adhesives, plasters and renders, grouting compositions, floor-filling compositions, jointing mortars, and paints, comprising a product produced by the process of claim 10.

17. A sole binder for coating compositions and adhesives, comprising a product produced by the process of claim 10.

18. A coating composition and binder for textiles and paper, comprising a product produced by the process of claim 10.

19. A process for preparing polyvinyl alcohol-stabilized addition polymers based on (meth)acrylate monomers in the form of their aqueous dispersions and water-redispersible dispersion powders by means of a polymerization selected from the group consisting of free-radically initiated emulsion polymerization and suspension polymerization of at least one monomer selected from the group consisting of the esters of acrylic acid, esters of methacrylic acid and further monomers copolymerizable therewith, in the presence of at least one protective colloid from the group of polyvinyl alcohols, which consists of the following steps and ingredients:
  a) conducting polymerization in the presence of from 0.001% to 0.01% by weight of initiator based on the total weight of the monomers, and
  b) including from 10% to 50% by weight of the monomers, based on the total weight of the monomers, in the initial charge and metering in the rest, and
  c) metering in the initiator comprising from 25% to 60% by weight of the total amount of initiator and, continuously until from 50% to 800 of the total polymerization time has elapsed, and
  d) in the remaining polymerization time, adding the remaining amount of initiator and at an accelerated metering rate which is at least twice as high as in step c);
  wherein the monomers and free-radical initiators are metered in such that the monomer conversion
  after 30 minutes of polymerization time is not more than 70%,
  after 60 minutes of polymerization time is not more than 75%,
  after 90 minutes of polymerization time is not more than 80%, after 120 minutes of polymerization time is not more than 85%, after 150 minutes of polymerization time is not more than 88%, after 180 minutes of polymerization time is not more than 90%, based in each case on the total amount of monomer introduced initially or metered in up to this point in time; and spray drying the aqueous dispersion obtained thereby selected from the group consisting of with an addition of further protective colloids as spraying aids, and without an addition of further protective colloids as spraying aids.

20. A process for preparing polyvinyl alcohol-stabilized addition polymers based on (meth)acrylate monomers in the form of their aqueous dispersions and water-redispersible dispersion powders by means of a polymerization selected from the group consisting of free-radically initiated emulsion polymerization and suspension polymerization of at least one monomer selected from the group consisting of the esters of acrylic acid, esters of methacrylic acid and further monomers copolymerizable therewith, in the presence of at least one protective colloid from the group of polyvinyl alcohols, which consists of the following steps and ingredients:

a) conducting polymerization in the presence of from 0.001% to 0.01% by weight of initiator and, from 0.001% to 0.015% by weight of reducing agent, based in each case on the total weight of the monomers, and b) including from 10% to 50% by weight of the monomers, based on the total weight of the monomers, in the initial charge and metering in the rest, and c) metering in the initiator and the reducing agent in toto, from 25% to 60% by weight of the total amount of initiator and of reducing agent being metered in continuously from 50% to 80% of the total polymerization time has elapsed, and d) in the remaining polymerization time, adding the remaining amount of initiator and reducing agent at an accelerated metering rate which is at least twice as high as in step c);

wherein the monomers and free-radical initiators are metered in such that the monomer conversion after 30 minutes of polymerization time is not more than 70%, after 60 minutes of polymerization time is not more than 75%, after 90 minutes of polymerization time is not more than 80%, after 120 minutes of polymerization time is not more than 85%, after 150 minutes of polymerization time is not more than 88%, after 180 minutes of polymerization time is not more than 90%, based in each case on the total amount of monomer introduced initially or metered in up to this point in time; and spray drying the aqueous dispersion obtained thereby selected from the group consisting of with an addition of further protective colloids as spraying aids, and without addition of further protective colloids as spraying aids.

* * * * *